US006222728B1

United States Patent
Jaggers et al.

(10) Patent No.: US 6,222,728 B1
(45) Date of Patent: Apr. 24, 2001

(54) ALIGNMENT TRAY FOR DOCKING A PORTABLE COMPUTER TO A DOCKING DEVICE

(75) Inventors: Chris Jaggers, Austin; Orin Ozias, Cedar Park; Bryan Howell; Bryan Hunter, both of Austin, all of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/056,520

(22) Filed: Apr. 7, 1998

(51) Int. Cl.$^7$ .................................. G06F 1/16; A47B 9/00
(52) U.S. Cl. .......................... 361/686; 361/683; 248/918; 248/124.1; 248/122.1
(58) Field of Search ..................... 361/679–687, 361/724–727; 248/918, 124.1, 122.1, 122, 917, 919, 920, 921, 922, 923; 312/223.2, 223.3

(56) References Cited

U.S. PATENT DOCUMENTS

| 3,829,132 | * | 8/1974 | Willieme ............................. 248/918 |
| 4,560,066 | | 12/1985 | Croteau . |
| 5,100,098 | * | 3/1992 | Hawkins ............................. 248/918 |
| 5,133,076 | * | 7/1992 | Hawkins et al. ..................... 361/686 |
| 5,290,178 | * | 3/1994 | Ma ....................................... 361/686 |
| 5,436,792 | * | 7/1995 | Lemanet et al. ..................... 361/686 |
| 5,535,093 | | 7/1996 | Noguchi et al. . |
| 5,553,824 | | 9/1996 | Dutra, Jr. . |
| 5,555,491 | * | 9/1996 | Tao ...................................... 361/686 |
| 5,568,359 | | 10/1996 | Cavello et al. . |
| 5,619,397 | * | 4/1997 | Honda et al. ........................ 361/686 |
| 5,633,782 | * | 5/1997 | Goodman et al. ................... 361/686 |
| 5,751,548 | * | 5/1998 | Hall et al. ............................ 361/686 |
| 5,859,762 | * | 1/1999 | Clark et al. .......................... 361/686 |
| 5,971,148 | * | 10/1999 | Jackson ............................... 248/918 |

* cited by examiner

*Primary Examiner*—Leo P. Picard
*Assistant Examiner*—Lisa Lea-Edmonds
(74) *Attorney, Agent, or Firm*—Haynes and Boone, L.L.P.

(57) ABSTRACT

An alignment tray for facilitating the docking of a computer to a docking device in which a tray member is adapted to receive the computer and guide the computer into a docking engagement with the docking device. The tray member is pivotal between an extended position in which it receives the computer and a folded position for storage or travel. A second tray member is provided which can either be connected to, or formed integrally with, the first-mentioned tray member and may be pivotally connected to the first-mentioned tray member so that the latter member pivots relative to the additional tray member and the docking device to and from its folded position.

17 Claims, 2 Drawing Sheets

ALIGNMENT TRAY FOR DOCKING A PORTABLE COMPUTER TO A DOCKING DEVICE

TECHNICAL FIELD

The present disclosure relates to an alignment tray for a portable computer, and, more particularly, to a portable alignment tray for facilitating the docking of a portable computer to a docking device.

BACKGROUND

Portable computers, such as notebook computers, laptop computers, and other similar types of computers, are becoming more and more popular due to their ability to be used in non-office environments. Docking devices, such as docking stations, port replicators, etc., have been designed to enable the portable computer to be easily interfaced with certain peripheral equipment, such as, monitors, printers, modems, etc., so that the portable computer can quickly be adapted for office use, yet can be quickly undocked for use in a non-office environment.

Alignment stands, or trays, are often provided to facilitate the docking of the portable computer to the docking device. Typical alignment trays are designed to rest on a table top or desk top and are provided with slots, rails, flanges, posts, etc. which cooperate with corresponding structure on the docking device and the portable computer to align the docking device in a fixed, precise location on the tray, and to guide the movement of the computer towards the docking device during the docking process. This permits corresponding connectors on the computer and the docking device to engage and electrically connect the computer to the docking device and therefore to the peripheral equipment.

However, the alignment trays of the above type are relatively large and heavy and thus do not lend themselves to portable use. Therefore, when a portable computer is used in a remote environment it is usually removed from the docking device and taken to the remote environment. Therefore when it is desired to dock the portable computer to a docking device in the remote environment, it is usually done so without a tray. This makes it difficult to align the computer with the docking device during the docking process and often results in misalignment of, and damage to, their respective connectors.

Therefore, what is needed is an alignment tray for a portable computer which is relatively small in size, light in weight and lends itself to portable use.

SUMMARY

Accordingly, the present disclosure is directed to an alignment tray for facilitating the docking of a portable computer to a docking device. The tray includes a tray member adapted to receive the computer and guide the computer into a docking engagement with the docking device. The tray member is pivotal between an extended position in which it receives the computer and a folded position.

A second tray member is provided which can either be connected to, or formed integrally with, the first-mentioned tray member and is pivotally connected to the first-mentioned tray member so that the latter member pivots relative to the additional tray member and the docking device to and from its folded position.

Several advantages result from the alignment tray of the present disclosure. For example, it is small in size and light in weight and lends itself to portable use. It also can be folded to reduce its size for travel, storage, or the like, and can easily be interfaced with a non-portable alignment tray commonly used in an office environment.

DESCRIPTION OF THE PREFERRED EMBODIMENT

Figure 1:
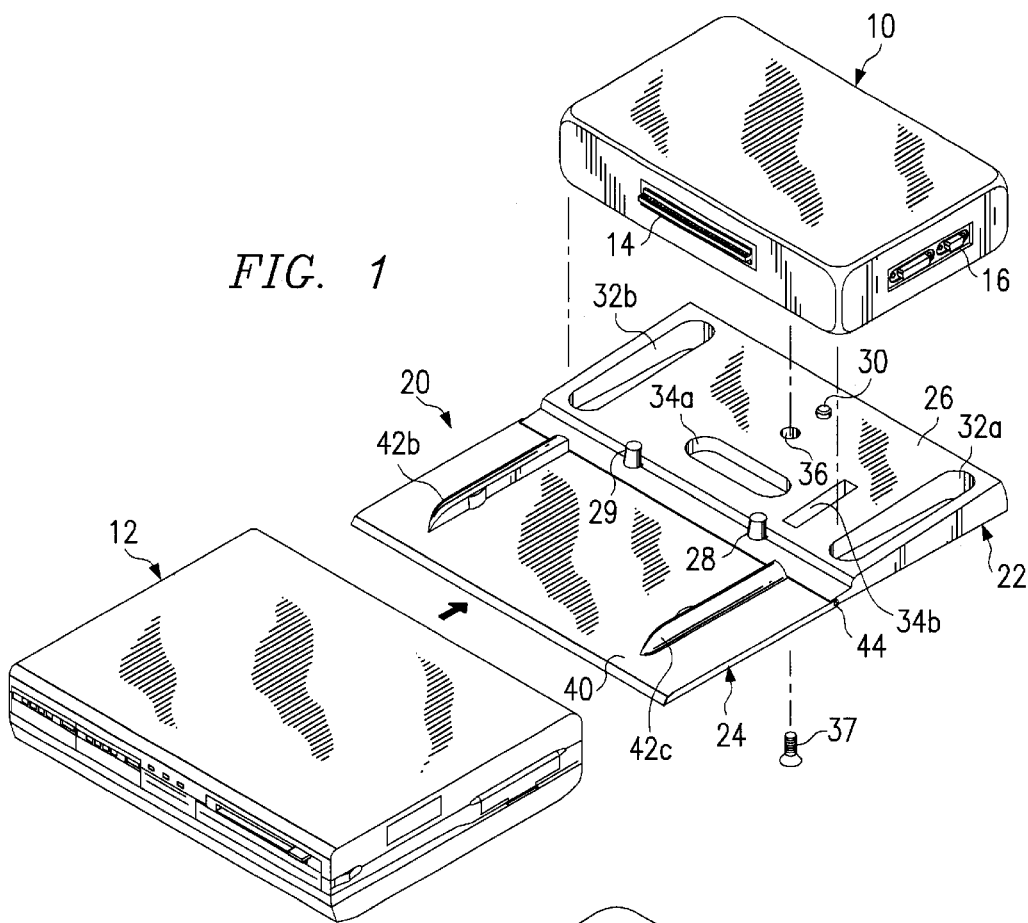
FIG. 1 is an exploded, isometric view of the portable alignment tray of the present disclosure along with a docking device and a portable computer.

Referring to FIG. 1 of the drawings, the reference numeral 10 refers in general to a docking device, which may be in the form of a docking station, a port replicator, or any similar device. The docking device 10 is adapted to receive a portable computer 12, which can be in the form of a laptop computer, a notebook computer, or the like. To this end, a connector 14 is provided on a front face of the docking device 10 which is adapted to engage a corresponding connector (not shown) on an adjacent rear face of the portable computer 12 to mechanically and electrically connect the computer to the docking device. One or more connectors 16 are also provided on a side face of the docking device 10, and it is understood that the rear face of the docking device is provided with similar connectors, which, along with the connectors 16, are adapted for connection, via standard cables, to peripheral equipment, such as, monitors, printers, modems, etc. This enables the portable computer 12 to be easily interfaced with the latter equipment via the docking device 10 so that the computer can quickly be adapted for office use, yet can easily be disconnected for portable use. Because all of these connectors, including the connectors 14 and 16, are conventional they will not be described in detail.

The alignment tray of the present disclosure is shown in general by the reference numeral 20 and includes a tray member 22 adapted to receive the docking device 10 and align it in a fixed, precise location on the tray member 22 in a manner to be described. An additional tray member 24 is also provided that is connected to the tray member 22 in a manner to be described and is adapted to guide the portable computer 12 into a position in which the above-mentioned connector on the rear face of the computer engages the connector 14 on the docking device 10.

The tray member 22 includes a base member 26 having a length and a width approximately corresponding to the length and width of the docking device 10. Two spaced alignment posts 28 and 29 project upwardly from the base member 26 near a front end thereof and are adapted to be engaged by a front end of the docking device 10 in a manner to be described to locate the device longitudinally relative to the base member. A third post 30 projects upwardly from the base member 26 near a rear end thereof and extends into a corresponding bore formed in a bottom surface of the docking device 10.

A pair of spaced slots 32a and 32b are provided through the base member 26 near the respective sides thereof for receiving feet (not shown) on the bottom surface of the docking device 10. The slots 32a and 32b are elongated in order to accommodate feet at different locations on the docking device 10. A pair of slots 34a and 34b are also provided through the base member 26 for enabling indicia on the bottom surface of the docking device 10, such as service tags, regulatory labels, etc. to be viewed through the base member 26. An opening 36 also extends through the base member 26 for receiving a bolt 37, the shaft of which passes through the opening and into a threaded bore on the bottom surface of the docking device 10 to fasten the docking device to the tray member 22.

The tray member 24 includes a base member 40 and a pair of spaced, longitudinally-extending rails 42a and 42b projecting upwardly from the base member 40. The rails 42a and 42b are adapted to be engaged in channels (not shown) provided on the lower surface of the portable computer 12 to locate and guide the computer with respect to the tray member 24, and therefore the tray member 22 and the docking device 10.

Assuming that the docking device 10 and the portable computer 12 are to be used in an environment other than a normal office environment, the tray 20 is placed on a flat surface as shown in FIG. 1, and the docking device 10 is lowered from the position shown until it engages the tray member 22, and is guided and retained relative to the tray member as discussed above. It is understood that the docking device 10 would be connected to a monitor, a keyboard, a modem and/or other peripheral equipment by proper cabling (not shown).

The portable computer 12 is then advanced towards the tray member 24 as shown by the arrow in FIG. 1 until the rails 42a and 42b extend in the channels provided on the bottom of the computer 12. The computer 12 is then advanced further towards its docked position shown in FIG. 2 in which the leading face of the computer engages the front face of the docking device 10 and the connector of the computer engages the connector 14 of the docking device. In this position, the computer 12 is also connected to the above-mentioned monitor, keyboard, modem, etc. through the docking device 10 to permit the computer to be used with this equipment.

Figure 3:
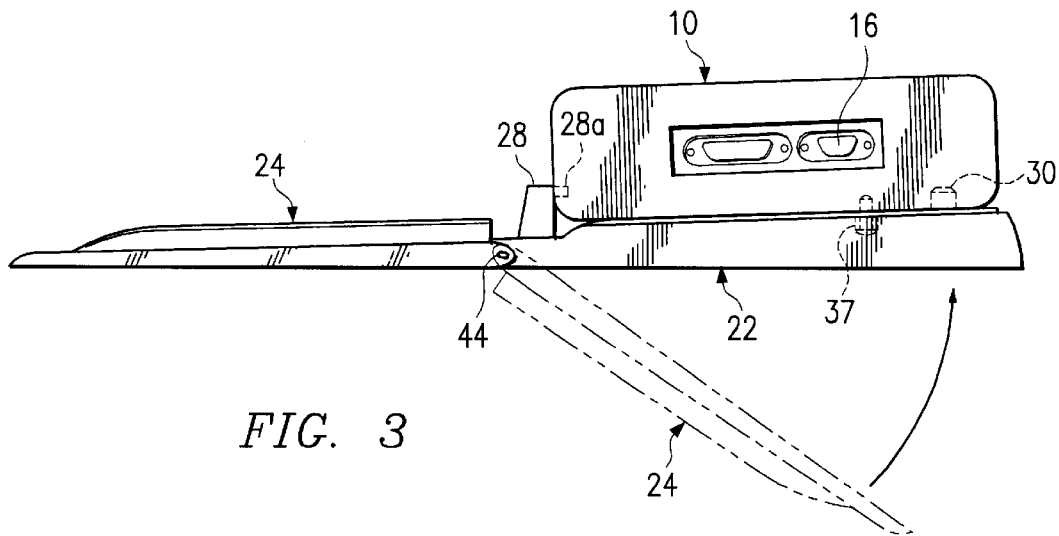
FIG. 3 is an enlarged side elevational view showing the tray and the docking device of FIGS. 1 and 2.

The specific manner in which the docking station 10 is retained to the tray member 22 is better shown in FIG. 3. More particularly, a lip 28a is provided on the post 28 which extends in a corresponding opening in the front face of the docking device 10. Although not shown in the drawing, it is understood that a corresponding lip is provided on the post 29 which extends in an opening in the front face of the docking device 10. FIG. 3 also depicts the above-mentioned post 30 extending in the bore formed in the bottom of the docking device 10 and the bolt 37 extending through the opening 36 and into the threaded bore provided in the bottom of the docking device.

Figure 2:
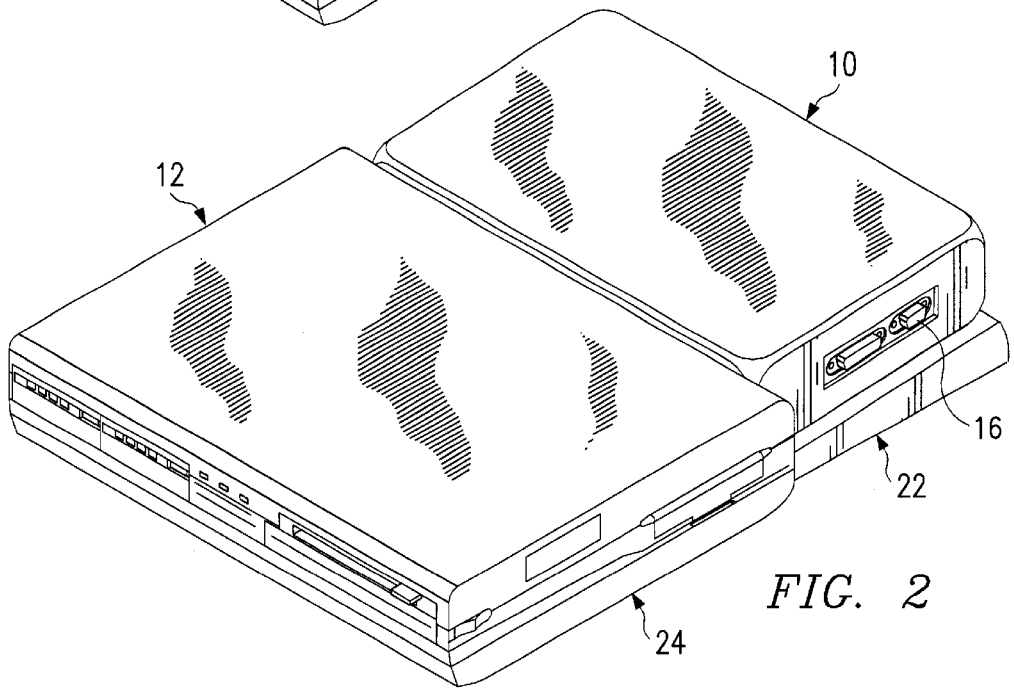
FIG. 2 is a view similar to FIG. 1 but showing the portable computer and the docking device of FIG. 1 in a docked relationship.
Figure 4:
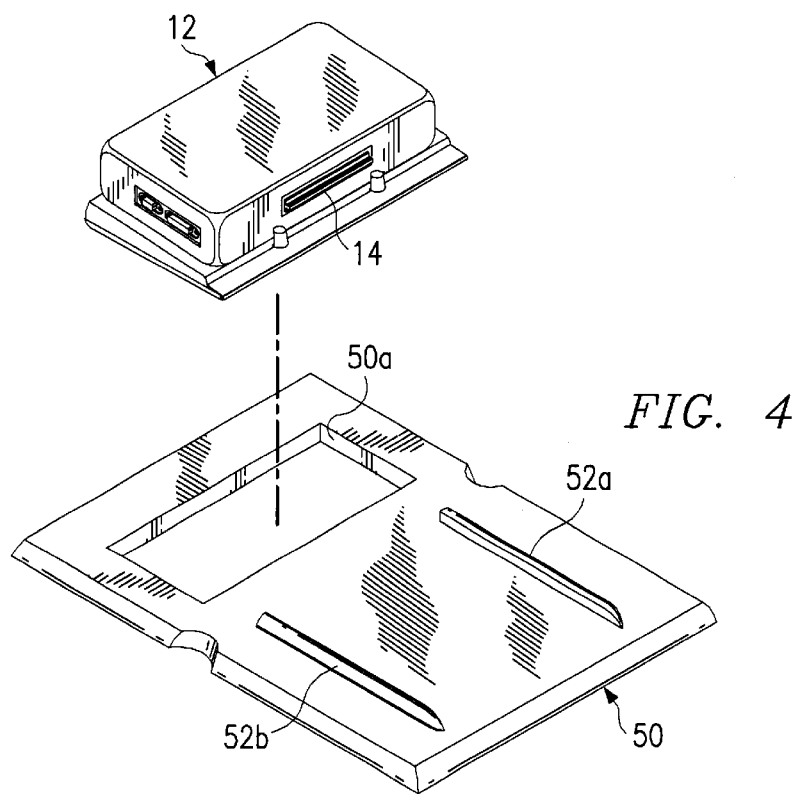
FIG. 4 is an exploded, isometric view depicting the tray and the docking device of FIG. 1 with a standard docking tray.

The alignment tray 20 is adapted to be pivoted from its operative position shown in FIGS. 1 and 2 and by the solid lines in FIG. 3 to a folded position shown in FIG. 4 in which it extends underneath the tray member 22. To this end, a hinge 44 is provided that connects the tray member 22 to the tray member 24 to permit the pivotal movement of the member 24 relative to the member 22 in the direction of the arrow in FIG. 3, with an intermediate position of the member 24 being shown by the phantom lines. The hinge 44 is of a type that permits the member 24 to pivot relative to the member 22 until it reaches a folded, substantially horizontal, position shown in FIG. 4. Because the hinge 44 is conventional, it will not be described in detail. It is understood that detents, or the like (not shown) are provided to retain the member 24 in its extended, open position and in its folded position.

The alignment tray 20 can be pivoted to its folded position in the above manner without the docking device 10 mounted thereon for travel, storage, or the like. In the event it is desired to use the portable computer 12 in a remote location, the tray 20 can be folded with the docking device 10 mounted thereon for use with an alignment tray 50 as shown in FIG. 4. The tray 50 is provided for use in an office environment and is standard except for the fact that it is specially adapted to receive the alignment tray 20 with the docking device 10 mounted thereon. To this end, a rectangular opening 50a is provided in the tray 50 which has a length and a width slightly greater than the length and width, respectively, of the folded alignment tray 20. Also, the tray 50 includes a pair of guide rails 52a and 52b which are identical to the guide rails 42a and 42b to guide the computer 12 into a docked position with the docking device 10. The tray 50 is otherwise of a standard design and, as such, is larger and heavier than the tray 20.

Therefore, if it is desired to utilize the computer 12 and the docking device 10 with the alignment tray 50 in a standard office environment, the folded tray 20, with the docking device 10 mounted thereon, can simply be inserted in the opening 50a of the tray 50 in the manner shown in FIG. 4. The computer 12 can then be docked to the docking device 10 by advancing the computer relative to the tray 50 and the docking device 10 so that the rails 52a and 52b extend in the above-mentioned channels in the bottom of the computer and therefore guide the computer into a docked position relative to the docking device in the manner described above. To this end, the design is such that the height, or thickness, of the folded tray 20 is such that it locates the connector 14 of the docking device 10 relative to the corresponding connector on the computer 12 so that the computer can be docked to the docking device in the manner described above.

Several advantages result from the alignment tray of the present disclosure. For example, it is small in size and light in weight and lends itself to portable use. It also can be folded to reduce its size for travel, storage, or the like, and can easily be interfaced with a non-portable alignment tray commonly used in an office environment.

It is understood that variations may be made in the foregoing without departing from the scope of the embodiments. For example, the docking device 10 can be formed integrally with the tray member 22. This embodiment would retain all of the advantages set forth above yet reduce costs due to the reduced number of parts. Also, the number of guide rails, posts and bolts can be varied within the scope of the embodiments. Further, the manner in which the computer 12 is guided by the tray member 24 can also be varied.

It is also understood that the disclosure described above is intended to illustrate rather than limit the present disclosure, and that it can take many other forms and embodiments within the scope of the disclosure as defined by the attached claims.

What is claimed is:

1. An alignment tray for facilitating the docking of a computer to a docking device, the tray comprising a first tray member adapted to receive the docking device, and a second tray member adapted to receive the computer and guide the computer into docking engagement with the docking device, the second tray member being connected to the first tray member in a manner to permit the second tray member to fold beneath the first tray member, the second tray member movable between an extended position in which the alignment tray receives the docking device and the computer, and a folded position in which the alignment tray receives only docking device.

2. The tray of claim 1 further comprising a hinge connecting the second tray member to the first tray member in a manner to permit the second tray member to pivot relative to the first tray member between the extended and folded position.

3. The tray of claim 1 wherein, in the folded position of the second tray member, the docking device and the folded tray are adapted to extend in an opening in a non-foldable docking device.

4. The tray of claim 1 further comprising at least one connecting member for connecting the docking device to the first tray member.

5. The tray of claim 4 wherein the connecting member also guides the docking device relative to the first tray member.

6. The tray of claim 5 wherein the connecting member comprises at least one post extending from the first tray member, at least a portion of the post extending in a corresponding opening in the docking device.

7. The tray of claim 6 wherein the post is adapted to be engaged by a front face of the docking device.

8. The tray of claim 6 wherein a lip is formed on the post that extends in a corresponding opening in the docking device.

9. The tray of claim 6 wherein the post is adapted to extend in an opening in a bottom surface of the docking device.

10. The tray of claim 6 further comprising an additional connecting member for connecting the docking device to the first tray member.

11. The tray of claim 10 wherein the additional connecting member comprises a bolt extending through an opening in the first tray member and into a threaded opening in the docking device.

12. The tray of claim 1 wherein the first tray member comprises a base member, a first post extending from the base member and adapted to be engaged by a front face of the docking device, the first post having a lip extending in a corresponding opening in the docking device, and a second post extending in an opening in a bottom surface of the docking device, the posts guiding and connecting the docking device relative to the first tray member.

13. The tray of claim 12 wherein an opening extends through the first tray member and further comprising a bolt adapted to extend through the opening and into a threaded opening formed in the docking device to further connect the docking device to the first tray member.

14. The tray of claim 1 wherein an opening extends through the first tray member and further comprising a bolt extending through the opening and into a threaded opening formed in the docking device to connect the docking device to the first tray member.

15. The tray of claim 1 wherein the second tray member comprises at least one guide member for guiding the computer into docking engagement with the docking device.

16. A method for docking a computer to a docking device comprising providing a first folding alignment tray, and folding the alignment tray beneath the docking device between an extended position in which it receives the computer and guides the computer into docking engagement with the docking device, and a folded position in which it receives only the docking device for mounting on a second non-folding alignment tray.

17. The method of claim 16 further comprising placing the docking device and the first folding alignment tray in the second non-folding alignment tray to permit docking of a computer while utilizing the non-folding alignment tray to guide the computer into the docked position.

* * * * *